(12) United States Patent
Lee et al.

(10) Patent No.: US 8,891,365 B2
(45) Date of Patent: Nov. 18, 2014

(54) DUAL CONNECTION ADMISSION CONTROL (CAC) AT ORIGINATION AND DESTINATION POINTS IN LTE AND EPC NETWORKS

(75) Inventors: Jay J. Lee, San Ramon, CA (US); Lee K. Tjio, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 543 days.

(21) Appl. No.: 12/639,225

(22) Filed: Dec. 16, 2009

(65) Prior Publication Data

US 2011/0141886 A1    Jun. 16, 2011

(51) Int. Cl.
*H04W 76/02*    (2009.01)
*H04L 12/54*    (2013.01)
*H04L 12/911*   (2013.01)
*H04L 12/927*   (2013.01)

(52) U.S. Cl.
CPC ......... *H04L 12/5695* (2013.01); *H04W 76/026* (2013.01); *H04L 47/781* (2013.01); *H04L 47/805* (2013.01); *H04L 47/824* (2013.01)
USPC ......................................... 370/230; 709/227

(58) Field of Classification Search
CPC ............................. H04W 28/24; H04W 76/026
USPC ................... 370/230–230.1; 709/226–228
See application file for complete search history.

(56) References Cited

U.S. PATENT DOCUMENTS

| | | | | |
|---|---|---|---|---|
| 7,907,524 | B2 * | 3/2011 | Willars et al. | 370/230 |
| 2007/0249339 | A1 * | 10/2007 | Tamura et al. | 455/433 |
| 2008/0052258 | A1 * | 2/2008 | Wang et al. | 706/46 |
| 2010/0154031 | A1 * | 6/2010 | Montemurro et al. | 726/1 |
| 2010/0217877 | A1 * | 8/2010 | Willars et al. | 709/228 |
| 2011/0145416 | A1 * | 6/2011 | You | 709/226 |
| 2011/0161504 | A1 * | 6/2011 | Zhou et al. | 709/227 |
| 2011/0235507 | A1 * | 9/2011 | You et al. | 370/230 |

FOREIGN PATENT DOCUMENTS

WO    WO 2009112639 A1 *  9/2009
WO    WO 2009146593 A1 * 12/2009    .............. H04L 12/56

OTHER PUBLICATIONS

ETSI TS 123 203 v9.2.0, Digital cellular telecommunications system (Phase 2+); Universal Mobile Telecommunications System (UMTS); LTE; Policy and charging control architecture (Release 9), Oct. 2009.*

* cited by examiner

*Primary Examiner* — Benjamin Lamont

(57) ABSTRACT

A device receives session information and subscription information, for a service request, from an originating evolved packet system (EPS) network, and forwards the session information and the subscription information to a destination policy control and charging rules function (PCRF) device associated with a destination EPS network. The device receives, from the destination PCRF device, a connection admission control (CAC) decision for the destination EPS network; determines, based on the CAC decision for the destination EPS network, a dual CAC decision for the originating EPS network and the destination EPS network; and forwards, to the destination PCRF device, the dual CAC decision.

20 Claims, 7 Drawing Sheets

DUAL CONNECTION ADMISSION CONTROL (CAC) AT ORIGINATION AND DESTINATION POINTS IN LTE AND EPC NETWORKS

BACKGROUND

Internet protocol (IP) multimedia subsystem (IMS) is a new architecture developed so that IP networks can rapidly deploy new IP-based multimedia services. An evolved packet system (EPS) network is a next generation packet network architecture developed by the 3rd Generation Partnership Project (3GPP). EPS includes long term evolution (LTE) access networks and evolved packet core (EPC) networks (also referred to as system architecture evolution (SAE) networks). IMS over EPC networks is envisioned to be a next generation network architecture that supports a variety of access technologies and provides advanced IP multimedia services with seamless mobility.

An objective of call or connection admission control (CAC) is to determine whether an arriving call or connection with specified Quality of Service (QoS) requirements (e.g., bandwidth, packet loss probability, packet delay, jitter, etc.) should be admitted to the network. A new connection request is admitted, if the QoS requirements for the call can be satisfied without jeopardizing the QoS constraints of existing connections in the network. Otherwise, the request is rejected. The goal of CAC is to guarantee QoS for all connections in the network, while at the same time making efficient use of network resources (e.g., accommodating as many connections as possible).

The application of CAC to guarantee end-to-end QoS requirements of any connection can be quite complex. In a real network, such as an EPS network, control messages have to be sent along the end-to-end connection path to ascertain whether the QoS objective could be met without adversely affecting other connections in progress. Because of this, CAC is typically implemented only at a gateway for an originating call or connection. While this approach guarantees QoS requirements at the originating access node, it fails to guarantee any other nodes on a connection path beyond the originating node. In particular, there is no guarantee at a destination access node, which may be as important as the originating access node.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that perform connection admission control at both originating and destination access points of a connection (referred to herein as "dual CAC"). The systems and/or methods may utilize current IMS and Policy and Charging Control (PCC) standards in 4G networks, as specified in the 3GPP. While the systems and/or methods described herein are discussed primarily in the context of EPS network architecture, they may be applicable to other networks.

In one exemplary implementation, the systems and/or methods may receive IMS session information and subscription information, for a service request, from an originating EPS network, and may forward the session information and subscription information to a destination policy control and charging rules function (PCRF) device associated with a destination EPS network. The systems and/or methods may receive, from the destination PCRF device, a connection admission control (CAC) decision for the destination EPS network; may determine, based on the CAC decision for the destination EPS network, a dual CAC decision for the originating EPS network and the destination EPS network; and may forward the dual CAC decision to the destination PCRF device.

As used herein, the terms "user," "subscriber," and "caller" are intended to be broadly interpreted to include a user device or a user of a user device.

Figure 1:
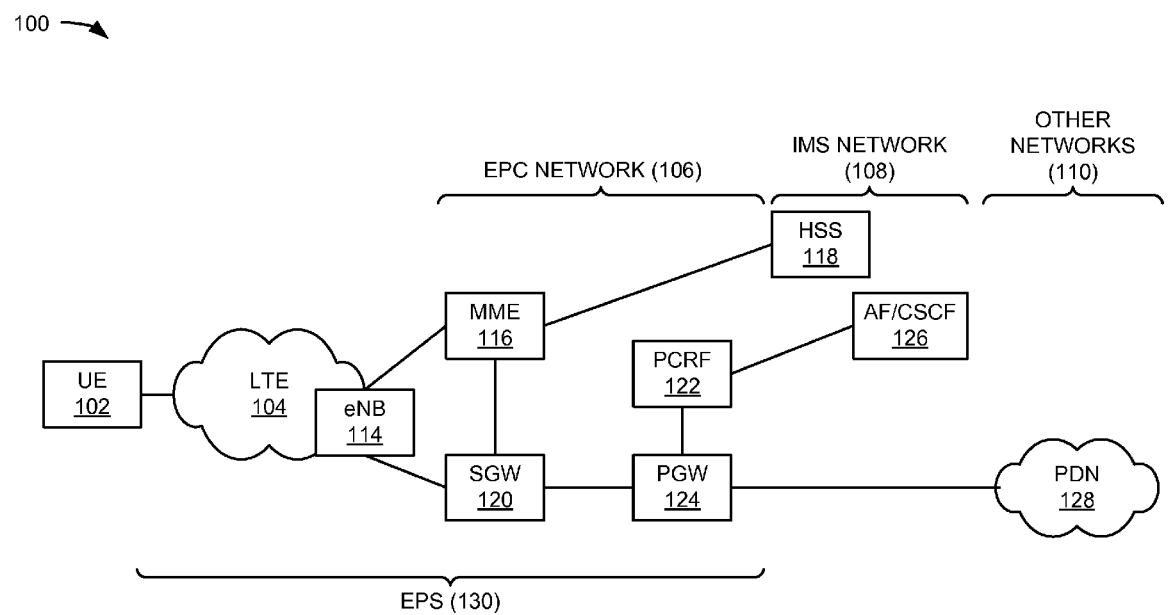
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include user equipment (UE) 102, a Long Term Evolution (LTE) network 104, an EPC network 106, an IMS network 108, and other networks 110. LTE network 104 may include an eNodeB (eNB) 114. EPC network 106 may include a mobility management entity (MME) 116, a serving gateway (SGW) 120, a PCRF 122, and a packet data network (PDN) gateway (PGW) 124. IMS network 108 may include a home subscriber server (HSS) 118 and an application function (AF)/call session control function (CSCF) 126. Other networks 110 may include a PDN 128. Together components of LTE network 104 and EPC network 106 may form EPS network 130. Devices/networks of network 100 may interconnect via wired and/or wireless connections.

A single UE 102, LTE network 104, EPC network 106, IMS network 108, other networks 110, eNB 114, MME 116, HSS 118, SGW 120, PCRF 122, PGW 124, AF/CSCF 126, and PDN 128 have been illustrated in FIG. 1 for simplicity. In practice, there may be more UEs 102, LTE networks 104, EPC networks 106, IMS networks 108, other networks 110, eNBs 114, MMEs 116, HSSs 118, SGWs 120, PCRFs 122, PGWs 124, AF/CSCFs 126, and/or PDNs 128. Also, in some instances, one or more of the components of network 100 may perform one or more functions described as being performed by another one or more of the components of network 100. As further shown in FIG. 1, components of LTE network 104 may connect to components of EPC network 106, and components of EPC network 106 may connect to components of IMS network 108 and/or component(s) of other networks 110.

UE 102 may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a landline telephone, or other types of computation or communication devices. In an exemplary implementation, UE 102 may include a device that is capable of communicating over LTE network 104, EPC network 106, IMS network 108, and/or other networks 110.

LTE network 104 may include a communications network that connects subscribers (e.g., UE 102) to a service provider. LTE network 104 may include a radio access network capable of supporting high data rate, low latency, packet optimization, large capacity and coverage, etc. LTE network 104 may also be referred to as evolved universal terrestrial radio access network (E-UTRAN). In addition to LTE network 104, other access networks, such as a WiFi network or an enhanced high-rate packet data (eHRPD) network, may be included.

EPC network 106 may include a core network architecture of the 3GPP's LTE wireless communication standard. IMS network 108 may include an architectural framework or network (e.g., a telecommunications network) for delivering IP multimedia services. Other networks 110 may include one or more packet-based networks (e.g., PDN 128, a PSTN, etc.) capable of communicating with UE 102.

eNB 114 may include one or more computation and/or communication devices that receive voice and/or data from MME 116 and/or SGW 120 and transmit that voice and/or data to UE 102. eNB 114 may also receive voice and/or data from UE 102 and transmit that voice and/or data to one of MME 116 and/or SGW 120 or to other UEs 102. Thus, eNB 114 may combine the functionality of a base station and radio access controller (RNC) in radio access networks of 2G or 3G.

MME 116 may include one or more computation and/or communication devices that may be responsible for idle mode tracking and paging procedures (e.g., including retransmissions) for UE 102. MME 116 may be involved in a bearer (e.g., a SGW or a PGW) activation/deactivation process (e.g., for UE 102) and may choose a SGW for UE 102 at an initial attach and at a time of intra-LTE handover. MME 116 may authenticate UE 102 (e.g., via interaction with HSS 118). Non-access stratum (NAS) signaling may terminate at MME 116 and MME 116 may generate and allocate temporary identities to UEs (e.g., UE 102). MME 116 may check authorization of UE 102 to camp on a service provider's Public Land Mobile Network (PLMN) and may enforce roaming restrictions for UE 102. MME 116 may be a termination point in EPC network 106 for ciphering/integrity protection for NAS signaling and may handle security key management.

SGW 120 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one exemplary implementation, SGW 120 may route and forward user data packets, may act as a mobility anchor for a user plane during inter-eNB handovers, and may act as an anchor for mobility between LTE and other 3GPP technologies. For idle state UEs, SGW 120 may terminate a downlink (DL) data path and may trigger paging when DL data arrives for UE 102. SGW 120 may manage and store contexts associated with UE 102 (e.g., parameters of an IP bearer service, network internal routing information, etc.).

PCRF 122 may include one or more computation or communication devices that may provide policy control decision and flow based charging control functionalities. PCRF 122 may provide network control regarding service data flow detection, gating, quality of service (QoS) and flow based charging, etc. PCRF 122 may determine how a certain service data flow shall be treated, and may ensure that user plane traffic mapping and treatment is in accordance with a user's subscription profile. PCRF 122 may interface with PGW 124 over a Gx interface, and may interface with P-CSCF 122 over a Rx interface.

PGW 124 may include one or more data transfer devices (or network devices), such as a gateway, a router, a switch, a firewall, a NIC, a hub, a bridge, a proxy server, an OADM, or some other type of device that processes and/or transfers data. In one exemplary implementation, PGW 124 may provide connectivity of UE 102 to external packet data networks (e.g., to PDN 128) by being a traffic exit/entry point for UE 102. UE 102 may simultaneously connect to more than one PGW for accessing multiple PDNs. PGW 124 may perform policy enforcement, packet filtering for each user, charging support, lawful intercept, and packet screening. PGW 124 may also act as an anchor for mobility between 3GPP and non-3GPP technologies.

HSS 118 may include one or more computation or communication devices that gather, process, search, and/or provide information in a manner described herein. In one exemplary implementation, HSS 118 may include a master user database that supports devices of IMS network 108 that handle calls. HSS 118 may contain subscription-related information (e.g., subscriber profiles), may perform authentication and authorization of a user, and may provide information about a subscriber's location and IP information.

AF/CSCF 126 may include one or more computation or communication devices that gather, process, search, and/or provide information in a manner described herein. In an exemplary implementation, AF/CSCF 126 may process session initiation protocol (SIP) signaling packets in IMS network 108. AF/CSCF 126 may include a proxy-CSCF, a serving-CSCF, and/or an interrogating-CSCF. A proxy-CSCF may inspect signaling messages, and may authenticate a user and establish a security association with the user. Also, the proxy-CSCF may compress and decompress SIP messages, may authorize media plane resources over the media plane, and may generate charging records. A serving-CSCF may handle SIP registrations, may inspect signaling messages, and may select an application server to which a SIP message will be forwarded. An interrogating-CSCF may query a HSS (e.g., HSS 118) to retrieve a user, and may route a SIP request to its assigned serving-CSCF.

PDN 128 may include a network that provides data services (e.g., via packets), such as the Internet, an intranet, an asynchronous transfer mode (ATM) network, etc. In some implementations PDN 128 may be an IP/MPLS (Multiprotocol Label Switching) core network.

Although FIG. 1 shows exemplary devices/networks of network 100, in other implementations, network 100 may contain fewer, different, differently arranged, or additional device/networks than depicted in FIG. 1.

Figure 2:
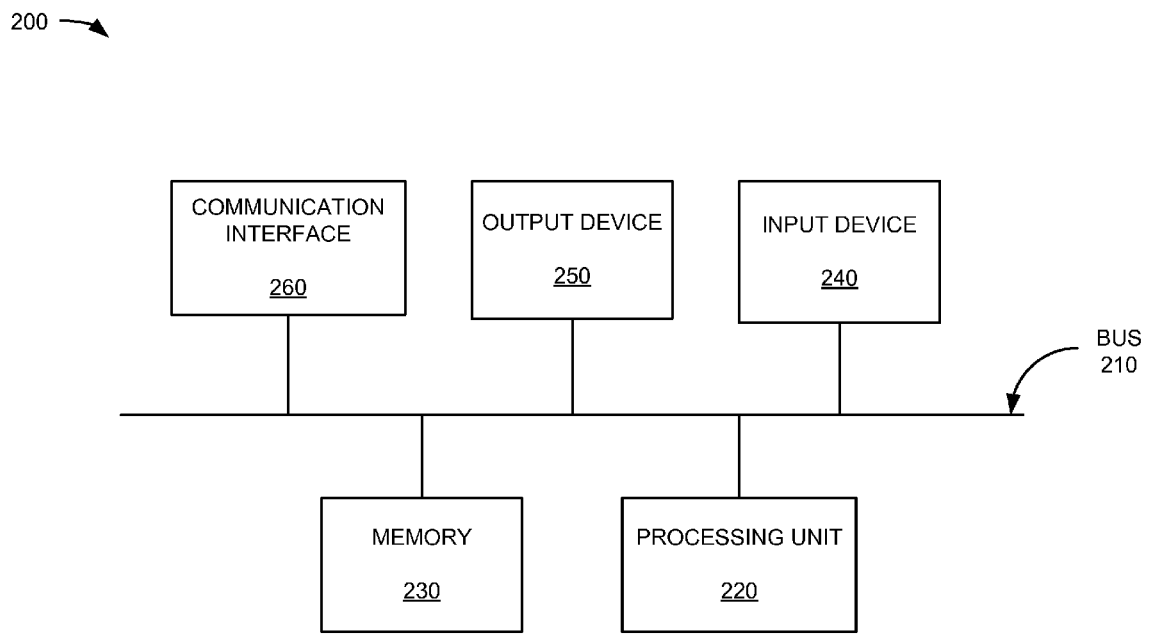
FIG. 2 is a diagram of exemplary components of a device that may correspond to one of the devices of the network depicted in FIG. 1.

FIG. 2 is a diagram of exemplary components of a device 200 that may correspond to one of the devices of network 100. One or more of the devices depicted in FIGS. 3-6 (and described below) may contain comparable configurations. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. Alternatively, or additionally, one or more components of device 200 may perform one or more other tasks described as being performed by one or more other components of device 200.

Figure 3:
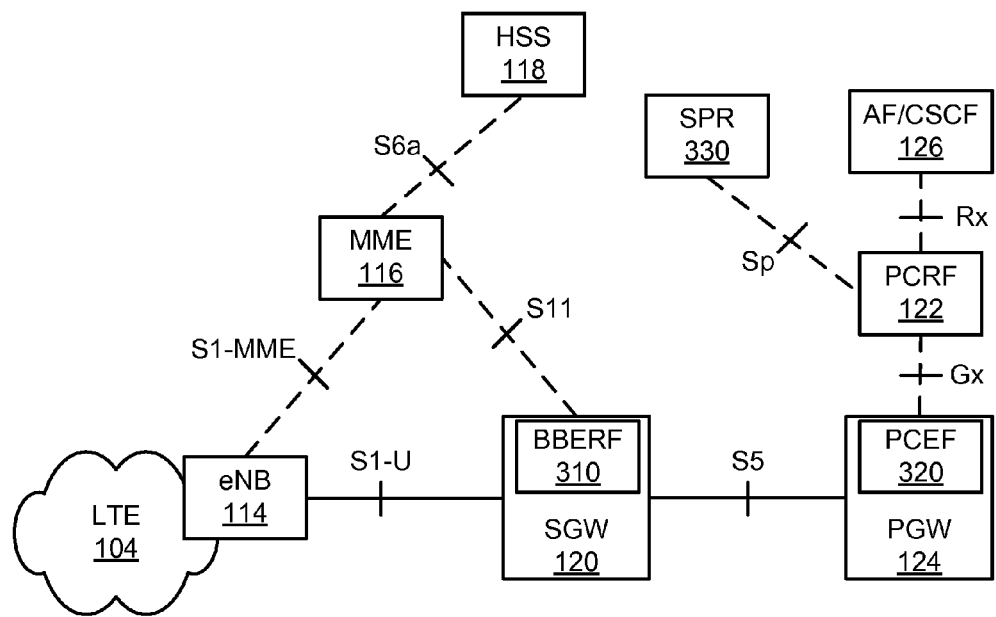
FIG. 3 is a diagram of an exemplary portion of the EPS network of FIG. 1 including architecture for policy and charging control (PCC)

FIG. 3 is a diagram of an exemplary portion 300 of EPS network 130 including architecture for PCC. As shown, exemplary network portion 300 may include LTE network 104, eNB 114, MME 116, HSS 118, SGW 120 including a bearer binding and event reporting function (BBERF 310), PCRF 122, PGW 124 including a policy and charging enforcement function (PCEF) 320, AF/CSCF 126, and a subscription profile repository (SPR) 330. LTE network 104, eNB 114, MME 116, HSS 118, SGW 120, PCRF 122, PGW 124, and AF/CSCF 126 may include the features described above in connection with, for example, FIGS. 1 and 2.

Generally, the PCC architecture of exemplary network portion 300 may enable operators to provide QoS to subscribers for IP-based services and charge for the resources provided based on the user's subscription information and other policy information. PCRF 122 may act as a policy engine of PCC. For example, PCRF 122 may make policy decisions for a UE (e.g., UE 102) upon request, and may provide charging and QoS rules to PCEF 320, over a Gx interface, and QoS rules to BBERF 310 (e.g., via PGW 124) for enforcement. The charging rules may contain information to identify flows along with charging rates. The QoS rules may contain information to identify flows along with the QoS behavior to be enforced, such as a QoS class indicator, a maximum bit rate (MBR), an aggregate MBR (AMBR), etc.

BBERF 310 may include hardware or a combination of hardware and software to apply QoS rules to service data flows in the access network (e.g., LTE network 104) and binding of IP flows to access bearers. PCEF 320 may include hardware or a combination of hardware and software to enforce policy decisions received from PCRF 122 and also may provide PCRF 122 with user- and access-specific information over a Gx interface. SPR 330 may include one or more storage devices that contain the QoS and charging subscription policies for the users.

AF/CSCF 126 may interact or intervene with applications that require dynamic policy and charging control. In one implementation, AF/CSCF 126 may extract session information and may provide the session information to PCRF 122 over a Rx interface.

In operation, PCRF 122 may be the central entity in PCC and may make policy and charging control decisions. Decisions of PCRF 122 can be based on input from a number of different sources, including an operator configuration in PCRF 122 that defines the policies to a given service; subscription information for a given user, received from SPR 330; information about the service received from AF/CSCF 126 in IMS; and/or information from the access network (e.g., LTE network 104) about what access technology is used and other information.

Although FIG. 3 shows exemplary components of network portion 300, in other implementations, network portion 300 may contain fewer, different, differently arranged, or additional components than depicted in FIG. 3. Additionally, or alternatively, one or more components of network portion 300 may perform one or more other tasks described as being performed by one or more other components of network portion 300.

Figure 4:
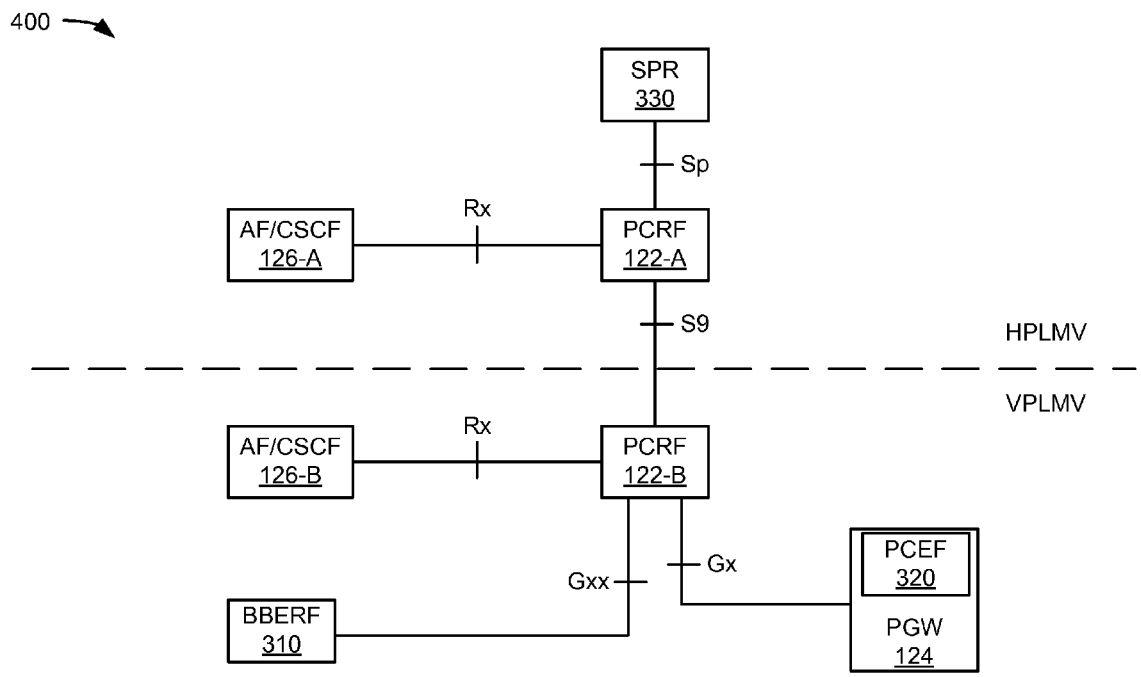
FIG. 4 is a diagram of an exemplary portion of the network depicted in FIG. 1 including PCC architecture for roaming between a home public land mobile network (HPLMN) and a visited public land mobile network (VPLMN)

FIG. 4 is a diagram of an exemplary portion 400 of network 100 including PCC architecture for roaming between a home public land mobile network (HPLMN) and a visited public land mobile network (VPLMN). As shown, exemplary network portion 400 may include PCRFs 122-A and 122-B, PGW 124, AF/CSCFs 126-A and 126-B, BBERF 310, PCEF 320, and SPR 330. PCRFs 122-A and 122-B may include the features described above in connection with, for example, PCRF 122. AF/CSCFs 126-A and 126-B may include the features described above in connection with, for example, AF/CSCF 126. PGW 124, BBERF 310, PCEF 320, and SPR 330 may include the features described above in connection with, for example, FIG. 3.

Roaming between HPLMN and VPLMN may be made possible by a S9 reference point (e.g., as defined in 3GPP Technical Specification 29.215). The S9 reference point may reside between a PCRF in the HPLMN (PCRF 122-A) and a PCRF in the VPLMN (PCRF 122-B). For roaming with a visited 3GPP access (PCEF 320 in the VPLMN), the S9 reference point may enable PCRF 122-A via PCRF 122-B to have dynamic PCC control (e.g., of both PCEF 320 and, if applicable, BBERF 310 in the VPLMN), and to have Rx authorization and event subscription from AF/CSCF 126-B in the VPLMN.

Although FIG. 4 shows exemplary components of network portion 400, in other implementations, network portion 400 may contain fewer, different, differently arranged, or additional components than depicted in FIG. 4. Additionally, or alternatively, one or more components of network portion 400 may perform one or more other tasks described as being performed by one or more other components of network portion 400.

Figure 5:
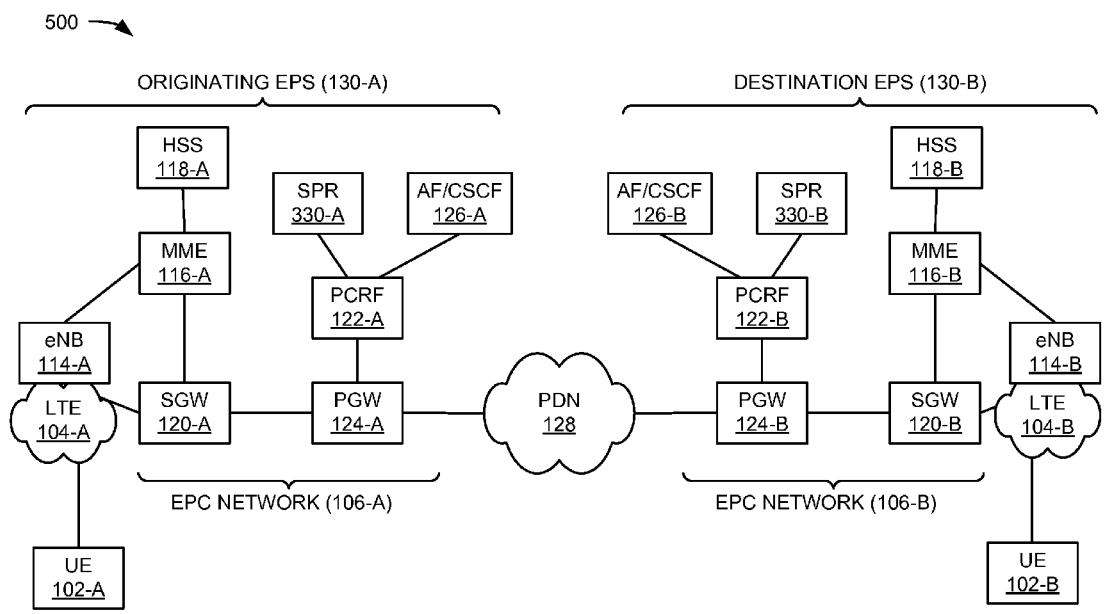
FIG. 5 is a diagram of an exemplary portion of the network depicted in FIG. 1 illustrating an end-to-end connection in LTE, EPC, and IP core networks.

FIG. 5 is a diagram of an exemplary portion 500 of network 100 illustrating an end-to-end connection in LTE, EPC and IP core networks. As shown, exemplary network portion 500 may include an originating EPS network 130-A and a destination EPS network 130-B interconnected by PDN 128 (e.g., the IP core network). EPS network 130-A and EPS network 130-B may include the components and features described above in connection with, for example, EPS network 130 in FIGS. 1-4. PDN 128 may include the features described above in connection with, for example, FIGS. 1 and 4.

The conventional approach to CAC can be classified in two ways: local and global CAC. In the local CAC, a PCRF (e.g., PCRF 122-A or PCRF 122-B) decides if a call or connection may be admitted to a network based on information from a single access point. This local approach is relatively simple to implement in real networks, but it has an obvious drawback. The decision is made based on a local access node or an origination access node that a user or a connection tries to access; therefore, it can only guarantee the required level of QoS for its local access point. The local access point may be considered the EPS network (e.g., EPS network 130-A or EPS network 130-B) associated with the particular PCRF (e.g., PCRF 122-A or PCRF 122-B). Referring to FIG. 5, assume the access point is originating EPS network 130-A. Thus, in local CAC applied to an end-to-end configuration between UE 102-A and UE 102-B of FIG. 5, other nodes in the end-to-end connection path are left to chance, and there is no QoS guarantee on those nodes. In particular, there may be no resource reservation on destination EPS network 130-B, which may be as important as originating EPS network 130-A. Conversely, global CAC may reserve the required resources end-to-end (e.g., originating EPS network 130-A, PDN 128, and destination EPS network 130-B). While global CAC can guarantee QoS end-to-end for a given connection, global CAC is too complex and incurs too much overhead in networks for practical use.

Implementations described herein apply dual CAC to perform admission control based on both an originating node (e.g., EPS network 130-A) and a destination node (e.g., EPS network 130-B). While dual CAC may not guarantee the required QoS in PDN 128 (e.g., the IP/MPLS core network), required resources may be reserved in both originating EPS network 130-A and destination EPS network 130-B (e.g., including LTE network 104-A/EPC 106-A and LTE network 104-B/EPC 106-B, respectively). In cellular networks, the limiting factor for QoS has generally been on scarce radio access networks (e.g., LTE networks 104), and to some extent on the EPC networks (e.g., EPC networks 106). In the IP/MPLS core network, bandwidth may relatively plentiful, and, if needed, MPLS protocols can reserve the required resources in the IP/MPLS core network, based on deep packet inspection (DPI). Therefore, the resource reservation in the IP/MPLS core network may not be required, while it may be considered essential to reserve resources in both originating and destination access points (e.g., EPS network 130-A and EPS network 130-B). By reserving the required resources on both originating EPS network 130-A and destination EPS network 130-B, dual CAC may improve network performance and provide better QoS than, for example, local CAC. Dual CAC may be based on the existing specification of 3GPP on the PCC architecture and, thus, may require no additional network interfaces, protocols, and/or equipment.

Figure 6:
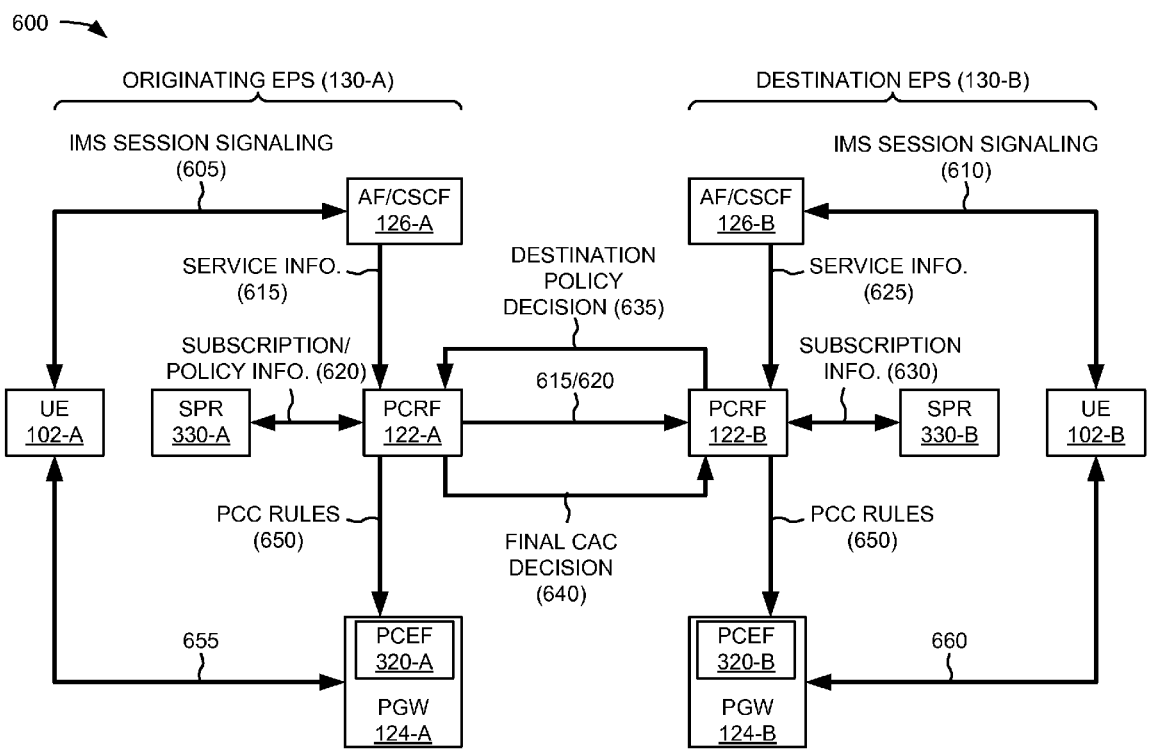
FIG. 6 is a diagram of exemplary interactions among components of an exemplary portion of the network depicted in FIG. 1.

FIG. 6 is a diagram of exemplary interactions among components of an exemplary portion 600 of network 100. As shown, exemplary network portion 600 may include portions of originating EPS network 130-A and destination EPS network 130-B. More particularly, network portion 600 may include may include UEs 102-A and 102-B, PCRFs 122-A and 122-B, PGWs 124-A and 124-B, AF/CSCFs 126-A and 126-B, PCEFs 320-A and 320-B, and SPRs 330-A and 330-B. UEs 102-A and 102-B may include the features described above in connection with, for example, UE 102. PCRFs 122-A and 122-B may include the features described above in connection with, for example, PCRF 122. AF/CSCFs 126-A and 126-B may include the features described above in connection with, for example, AF/CSCF 126. EPS networks 130-A and 130-B may include the features described above in connection with, for example, EPS network 130. PCEFs 320-A and 320-B may include the features described above in connection with, for example, PCEF 320. SPRs 330-A and 330-B may include the features described above in connection with, for example, SPR 330.

Interactions described herein in connection with FIG. 6 may be conducted to provide dual CAC for PCC for calls originating at EPS network 130-A. Admission decisions may be based on policy information from both PCRFs 122-A and 122-B. A connection from UE 102-A may be admitted to the network only when the resources at both access points (e.g., EPS networks 130-A and 130-B) are available. Dual CAC may be based on the baseline PCC architecture, IMS, and the connection between the origination PCRF (PCRF 122-A) and the destination PCRF (PCRF 122-B). The connection between PCRFs 122-A and 122-B may use the S9 interface provided between the PCRF 122 in the HPLMV (e.g., an H-PCRF) and the PCRF 122 in the VPLMV (e.g., a V-PCRF) as defined in 3GPP standards, thus not requiring additional configuration in the network.

As further shown in FIG. 6, when a user initiates a service (e.g., an IMS voice call), UE 102-A may generate a SIP invite message that triggers IMS session signaling 605 through AF/CSCF 126-A. The SIP invite message may also trigger IMS session signaling 610 between AF/CSCF 126-B and UE 102-B. AF/CSCF 126-A and AF/CSCF 126-B may each be a proxy-CFCS in the context of IMS.

Based on service information in IMS session signaling 605/610, AF/CSCF 126-A may provide PCRF 122-A with service-related information over an Rx interface (as defined in 3GPP standards), as indicated by reference number 615. The service-related information may include, for example, IP addresses, a port number, a differentiated services code point (DSCP) value, type of services, a data rate, latency requirement, etc.

Subscription/policy information for UE 102-A may be retrieved, as indicated by reference number 620. More particularly, PCRF 122-A may request subscription/policy information 620 for the given user from SPR 330-A, and SPR 330-A may respond to the request over the Sp interface. Subscription/policy information 620 may contain operator-defined service policies, such as service level agreement (SLA), usage limit, subscription level, etc.

PCRF 122-A may send service information 615 received from AF/CSCF 126-A and subscription/policy information 620 received from SPR 330-A to PCRF 122-B, via the S9 interface, so that PCRF 122-B can make a separate CAC decision in destination EPS network 130-B. For example, service information and subscription/policy information 615/620 sent from PCRF 122-A may trigger (or include a separate request that triggers) PCRF 122-B to make a CAC decision for destination EPS network 130-B. Alternatively, PCRF 122-A may make a threshold decision whether to reject the connection for originating EPS network 130-A before sending service information 615 to PCRF 122-B, and may only send service information 615 to PCRF 122-B if PCRF 122-A determines the call should not be rejected based on service information 615 and/or subscription/policy information 620.

Based on service information in IMS session signaling 605/610, AF/CSCF 126-B may provide PCRF 122-B with service-related information over Rx interface, as indicated by reference number 625. PCRF 122-B may then request subscription-related information for the destination user (e.g., UE 102-B) from SPR 330-B, and SPR 330-B may respond to the request over Sp interface, as indicated by reference number 630.

Based on information 615/620 received from PCRF 122-A, service information 625, and subscription information 630, PCRF 122-B may make a policy decision whether to accept the connection for destination EPS network 130-B. PCRF 122-B may send its policy decision to the PCRF 122-A over S9 interface, as indicated by reference number 635.

PCRF 122-A may make a final decision whether to accept the connection from UE 102-A based on service information 615, subscription/policy information 620, service information 625, subscription information 630, and/or destination policy decision 635. PCRF 122-A may send a final CAC decision 640 to PCRF 122-B over the S9 interface.

In response to final decision 640 to accept the call from UE 102-A, PCRF 122-A and PCRF 122-B may send PCC rules 650 to PCEF 320-A and PCEF 320-B, respectively, for enforcement of the final CAC decision. PCEF 320-A and PCEF 320-B may each be located in an edge node where all user traffic passes for a given subscriber and the IP connection. For originating EPS network 130-A, PCEF 320-A may be located in PGW 124-A. For destination EPS 130-B, PCEF 320-B may be located in PGW 124-B.

As indicated by reference numbers 655 and 660, respectively, PCEF 320-A and PCEF 320-B may install PCC rules 650 and perform bearer binding to ensure that traffic for the service requested by UE 102-A receives appropriate QoS. The bearer binding may result in the establishment of a new bearer or a modification of an existing bearer.

Although FIG. 6 shows exemplary components of network portion 600, in other implementations, network portion 600 may contain fewer, different, differently arranged, or additional components than depicted in FIG. 6. Additionally, or alternatively, one or more components of network portion 600 may perform one or more other tasks described as being performed by one or more other components of network portion 600.

Figure 7:
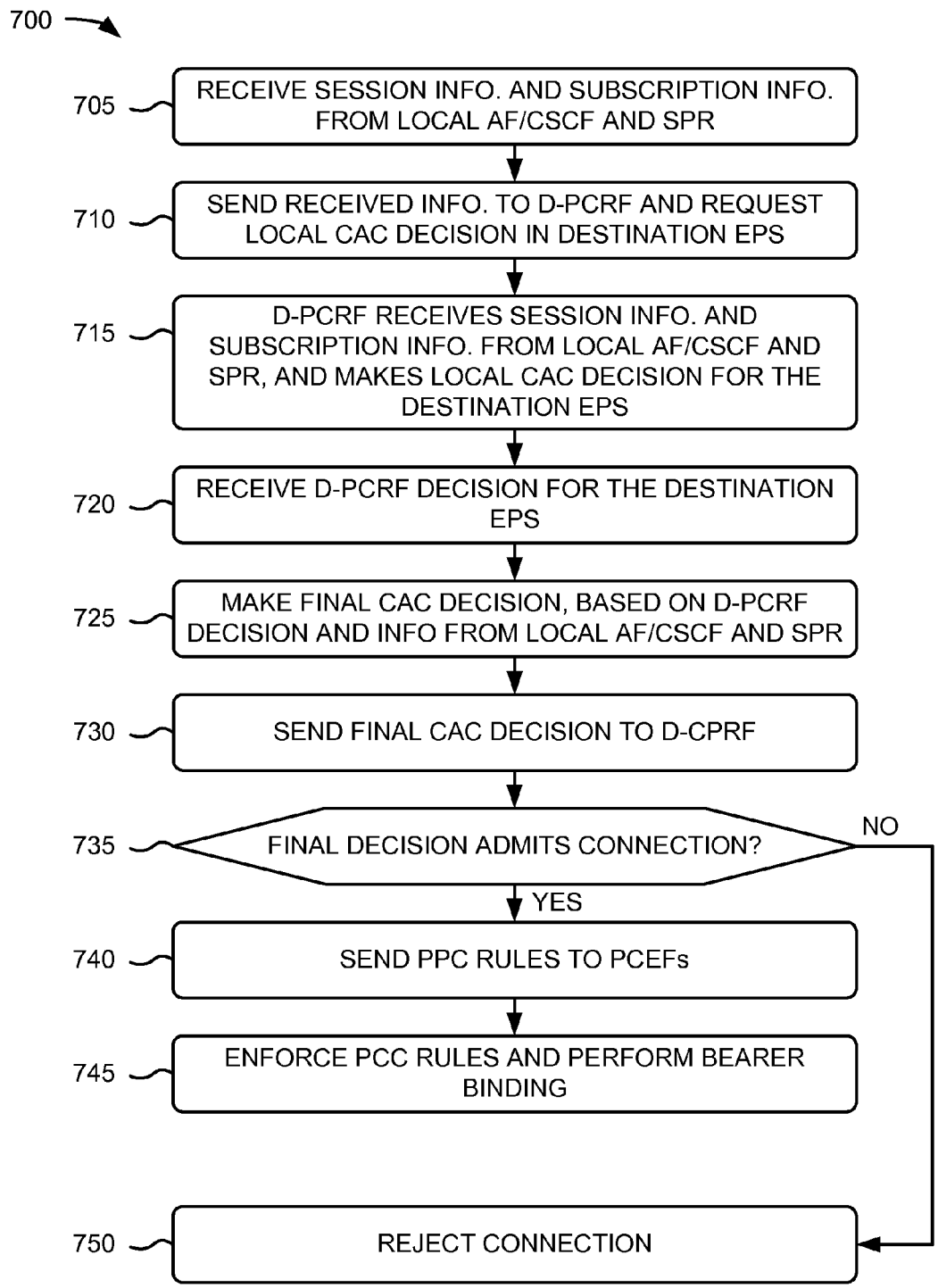
FIG. 7 depicts a flow chart of an exemplary process for providing dual CAC at origination and destination points according to implementations described herein.

FIG. 7 depicts a flow chart of an exemplary process 700 for providing dual CAC at origination and destination points according to implementations described herein. In one implementation, process 700 may be performed by an originating PCRF, such as PCRF 122-A. In another implementation, some or all of process 700 may be performed by another device or group of devices, including or excluding PCRF 122-A.

As shown in FIG. 7, process 700 may include receiving session information and subscription information from a local AF/CSCF and a local SPR (block 705) and sending the received information to a destination PCRF (D-PCRF) and requesting a local CAC decision in a destination EPS (block 710). For example, in implementations described above in connection with FIG. 6, when a user initiates a service, UE 102-A may generate a SIP invite message that triggers IMS session signaling 605 through AF/CSCF 126-A. The SIP invite message may also trigger IMS session signaling 615 between AF/CSCF 126-B and UE 102-B. Based on service information in IMS session signaling 605/610, AF/CSCF 126-A may provide PCRF 122-A with service-related information over an Rx interface, as indicated by reference number 615. PCRF 122-A may send service information 615 received from AF/CSCF 126-A and subscription/policy information 620 received from SPR 330-A to PCRF 122-B via the S9 interface so that PCRF 122-B can make a separate CAC decision in destination EPS 130-B. For example, service information and subscription/policy information 615/620 sent from PCRF 122-A may trigger PCRF 122-B to make a CAC decision for destination EPS 130-B.

As further shown in FIG. 7, the D-PCRF may receive session information and subscription information from its local AF/CSCF and a local SPR, and may make a local CAC decision for the destination EPS (block 715). For example, in implementations described above in connection with FIG. 6, AF/CSCF 126-B may provide PCRF 122-B with service-related information over an Rx interface, as indicated by reference number 625. PCRF 122-B may then request subscription-related information for the destination user (e.g., UE 102-B) from SPR 330-B, and SPR 330-B may respond to the request over a Sp interface, as indicated by reference number 630. Based on information 615/620 received from PCRF 122-A, service information 625, and subscription information 630, PCRF 122-B may makes a policy decision whether to accept the connection for destination EPS 130-B. PCRF 122-B may send its policy decision to the PCRF 122-A over the S9 interface, as indicated by reference number 635.

Returning to FIG. 7, the D-PCRF decision for the destination EPS may be received (block 720), a final CAC decision may be made based on the D-PCRF decision and the information from the local AF/CSCF and SPF (block 725), and the final CAC decision may be sent to the D-PCRF (block 730). For example, in implementations described above in connection with FIG. 6, PCRF 122-A may make a final decision whether to accept the connection from UE 102-A based on service information 615, subscription/policy information 620, service information 625, and subscription information 630. PCRF 122-A may send final CAC decision 640 to PCRF 122-B over the S9 interface.

Referring again to FIG. 7, it may be determined if the final decision admits a connection (block 735). If the final decision admits the connection (block 735—YES), PCC rules may be sent to PCEFs (block 740), and the PCC rules may be enforced and bearer binding may be performed (block 745). For example, in implementations described above in connection with FIG. 6, in response to final decision 640 to accept the call from UE 102-A, PCRF 122-A and PCRF 122-B may send PCC rules 650 to PCEF 320-A and PCEF 320-B, respectively, for enforcement of the final CAC decision. As indicated by reference numbers 655 and 660, respectively, PCEF 320-A and PCEF 320-B may install PCC rules 650 and perform bearer binding to ensure that traffic for the service requested by UE 102-A receives appropriate QoS.

If the final decision does not admit the connection (block 735—NO), the connection may be rejected (block 750). For example, PCRF 122-A may send a reject indication to the originating UE (e.g., UE 102-A). In one implementation the reject indication may include a cause value or error code to indicate a reason for the rejection.

Implementations described herein provide systems and/or methods that may provide a CAC decision for both an originating access point and a destination access point of an IMS service request. The systems and/or methods may receive session information and subscription information, for a service request, from an originating EPS network, and may forward the session information and subscription information to a destination PCRF device associated with a destination EPS network. The systems and/or methods may receive, from the destination PCRF device, a CAC decision for the destination EPS network; may determine, based on the CAC decision for the destination EPS network, a dual CAC decision for the originating EPS network and the destination EPS network; and may forward, to the destination PCRF device, the dual CAC decision. When the dual CAC decision includes admitting the service request, the systems and/or methods may also send, to other devices within the originating EPS network and the destination EPS network, instructions for policy enforcement and bearer binding to ensure that user traffic for the service receives a required level of QoS.

The systems and/or methods described herein may guarantee QoS at both originating and destination LTEs/EPCs using the interface between the PCRF in the origination point and the PCRF in the destination point. Thus, the systems and/or methods described herein may guarantee QoS better than local CAC, which is based only on the originating LTE and EPC. In particular, improvements in call drop rate during a call, latency, packet loss ratio, and signal quality may be realized. The dual CAC as described herein may utilize existing S9 interface, IMS, and PCC architecture, and may not require any changes in the current standards specifications in 3GPP. Therefore, no additional complexity is required for the implementation of the dual CAC.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving, by a computing device, session information for a service request from an originating network and subscription information for the service request, the computing device being a policy control and rules device, the session information for the service request being received from a first device, and the subscription information for the service request being received from a second device, the first device being different than the second device;

forwarding, by the computing device, the session information for the service request and the subscription information for the service request to a device associated with a destination network, the device being a policy control and rules device, and the originating network being different than the destination network;

receiving, by the computing device and from the device, a connection admission control (CAC) decision for the destination network, the CAC decision being based on session information associated with the destination network and subscription information associated with the destination network;

determining, by the computing device and based on the CAC decision for the destination network, a dual CAC decision for the originating network and the destination network, the dual CAC decision being based on the session information for the service request, the subscription information for the service request, policy information, and charging control information;

sending, by the computing device and to the device using an S9 interface, the dual CAC decision; and sending, by the computing device and to another device associated with the originating network, instructions for enforcing a policy and performing bearing binding, associated with the service request, when the dual CAC decision includes information for admitting the service request.

2. The method of claim 1, where the session information for the service request includes Internet protocol (IP) multimedia subsystem (IMS) session information received from a call session control function (CSCF) device associated with the originating network.

3. The method of claim 1, where the subscription information for the service request includes operator-defined subscription information received from a subscription profile repository (SPR) device associated with the originating network.

4. The method of claim 1, where when forwarding the session information for the service request and the subscription information for the service request, the method includes:

forwarding the session information for the service request and the subscription information for the service request to the device using a 3rd Generation Partnership Project (3GPP) S9 reference point, and when receiving the CAC decision, the method includes:

receiving the CAC decision using the 3GPP S9 reference point.

5. The method of claim 1, further comprising:
forwarding, by the computing device and to the device and using a 3rd Generation Partnership Project (3GPP) S9 reference point, a request for the CAC decision to be performed at the device.

6. The method of claim 1, where the device receives:
additional session information from a call session control function (CSCF) device associated with the destination network, and
additional subscription information from a subscription profile repository (SPR) device associated with the destination network.

7. The method of claim 1, where sending the instructions for enforcing the policy includes:
sending policy rules and charging control rules to a policy and charging enforcements function (PCEF) device.

8. A method comprising:
receiving, by a computing device and from an originating device, session information for a service request from an originating network and subscription information for the service request,
  the computing device being a policy control and rules device,
  the originating device being a policy control and rules device,
  the session information for the service request being provided by a first device,
  the subscription information for the service request being provided by a second device,
    the first device being different than the second device, and
  the computing device being associated with a destination network,
    the originating network being different than the destination network;
determining, by the computing device, a connection admission control (CAC) decision for the destination network,
  the determining being based on:
    the session information for the service request,
    the subscription information for the service request,
    session information associated with the destination network, and
    subscription information associated with the destination network;
forwarding, by the computing device and to the originating device, the CAC decision for the destination network;
receiving, by the computing device and from the originating device using an S9 interface, a dual CAC decision for the combination of the originating network and the destination network,
  the dual CAC decision being based on:
    the CAC decision for the destination network,
    the session information for the service request,
    the subscription information for the service request,
    policy information, and
    charging control information; and
sending, by the computing device and to another device within the destination network, instructions for enforcing a policy and performing bearing binding, associated with the service request, when the dual CAC decision includes information for admitting the service request.

9. The method of claim 8, further comprising:
receiving, from the originating device, a request for the CAC decision to be performed at the destination network.

10. The method of claim 8, where
when forwarding the CAC decision, the method includes:
  forwarding the CAC decision to the originating device using a 3rd Generation Partnership Project (3GPP) S9 reference point, and
when receiving the dual CAC decision, the method includes:
  receiving the dual CAC decision using the 3GPP S9 reference point.

11. A computing device comprising:
a memory to store a plurality of instructions; and
a processor to execute instructions in the memory to:
  receive session information for a service request from an originating network and subscription information for the service request,
    the session information for the service request being received from a first device,
    the subscription information for the service request being received from a second device,
      the first device being different than the second device;
  forward the session information for the service request and the subscription information for the service request to a destination device associated with a destination network,
    the computing device being a policy control and rules device,
    the destination device being a policy control and rules device, and
    the originating network being different than the destination network;
  receive, from the destination device, a connection admission control (CAC) decision for the destination network,
    the CAC decision for the destination network being based on session information associated with the destination network and subscription information associated with the destination network;
  determine, based on the CAC decision for the destination network, the session information for the service request, and the subscription information for the service request, a dual CAC decision for the originating network and the destination network,
    the dual CAC decision being further based on policy information and charging control information;
  forward, to the destination device and using an S9 interface, the dual CAC decision; and
  send, to a device associated with the originating network, instructions for enforcing a policy and performing bearing binding, associated with the service request, when the dual CAC decision includes information for admitting the service request.

12. The device of claim 11, where the processor is further to execute the instructions to:
send, to another device within the originating network, instructions for enforcing the policy when the dual CAC decision comprises admitting the service request.

13. The device of claim 11, where the session information for the service request includes Internet protocol (IP) multimedia subsystem (IMS) session information.

14. The device of claim 11, where the dual CAC decision is forwarded using a 3rd Generation Partnership Project (3GPP) S9 reference point.

15. A device comprising:
a memory to store a plurality of instructions; and
a processor to execute instructions in the memory to:

receive, from another device, session information for a
service request from an originating network and subscription information for the service request,
the device being a policy control and rules device,
the other device being a policy control and rules device,
the device being associated with a destination network,
the originating network being different than the destination network
the session information for the service request being provided by a first device, and
the subscription information for the service request being provided by a second device,
the first device being different than the second device;
determine, based on the session information for the service request, the subscription information for the service request, session information associated with the destination network, and subscription information associated with the destination network, a connection admission control (CAC) decision for the destination network;
forward, to the other device, the CAC decision for the destination network;
receive, from the other device and using an S9 interface, a dual CAC decision for the combination of the originating network and the destination network,
the dual CAC decision being based on:
the CAC decision for the destination network,
the session information for the service request,
the subscription information for the service request,
policy information, and
charging control information; and
send, to another device associated with the origination network, instructions for enforcing a policy and performing bearer binding, associated with the service request, when the dual CAC decision includes information for admitting the service request.

16. The device of claim 15, where the processor is further to execute the instructions to:
send, to another device within the destination network, instructions for policy enforcement when the dual CAC decision comprises admitting the service request.

17. The device of claim 15, where the processor is further to execute the instructions to forward the CAC decision for the destination network using a 3rd Generation Partnership Project (3GPP) S9 reference point.

18. A system comprising:
a device, implemented at least partially in hardware, to:
receive session information for a service request from an originating network and subscription information for the service request,
the session information for the service request being received from a first device,
the subscription information for the service request being received from a second device,
the first device being different than the second device;
forward the session information for the service request and subscription information for the service request to another device associated with a destination network,
the device being a policy control and rules device,
the other device being a policy control and rules device, and
the originating network being different than the destination network;
determine, based on the session information for the service request, the subscription information for the service request, session information associated with the destination network, and subscription information associated with the destination network, a connection admission control (CAC) decision for the destination network;
receive, from the destination network and at the originating network, the CAC decision for the destination network;
determine, based on the CAC decision for the destination network, the session information for the service request, and the subscription information for the service request, a dual CAC decision for the originating network and the destination network,
the dual CAC decision being further based on policy information and charging control information, and
the dual CAC decision being transmitted using an S9 interface; and
send, to other devices within the originating network and the destination network, instructions for enforcing a policy and performing bearer binding, associated with the service request, when the dual CAC decision includes information for admitting the service request.

19. The system of claim 18, where the device is further to:
transmit, when the dual CAC decision does not include information for admitting the service request, a reject indication to another device.

20. The system of claim 18, where the session information for the service request includes Internet protocol (IP) multimedia subsystem (IMS) session information.

* * * * *